(12) United States Patent
Inase et al.

(10) Patent No.: US 10,507,884 B2
(45) Date of Patent: Dec. 17, 2019

(54) REAR BRAKE DEVICE OF VEHICLE

(71) Applicant: HONDA MOTOR CO., LTD., Tokyo (JP)

(72) Inventors: Kosuke Inase, Wako (JP); Masayuki Iwata, Wako (JP); Kazuhiko Gogo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 15/714,270

(22) Filed: Sep. 25, 2017

(65) Prior Publication Data

US 2018/0086415 A1 Mar. 29, 2018

(30) Foreign Application Priority Data

Sep. 29, 2016 (JP) ................. 2016-192127

(51) Int. Cl.
*B62L 1/00* (2006.01)
*F16D 65/00* (2006.01)
(Continued)

(52) U.S. Cl.
CPC .............. *B62L 1/005* (2013.01); *B62K 19/38* (2013.01); *B62K 25/283* (2013.01); *F16D 65/0075* (2013.01)

(58) Field of Classification Search
CPC ...... B62K 11/04; B62K 19/38; B62K 25/283; B62L 1/005; F16D 65/18; F16D 65/0075;
(Continued)

(56) References Cited

U.S. PATENT DOCUMENTS 6,450,301 B1 9/2002 Iizuka et al.
7,942,484 B2 5/2011 Yamakura et al.
(Continued)

FOREIGN PATENT DOCUMENTS

| CN | 1343600 A | 4/2002 |
| CN | 101152891 A | 4/2008 |

(Continued)

OTHER PUBLICATIONS

Feb. 16, 2018 Extended Search Report issued in European Patent Application No. 17194213.9.

(Continued)

*Primary Examiner* — Joseph M Rocca
*Assistant Examiner* — Felicia L. Brittman
(74) *Attorney, Agent, or Firm* — Squire Patton Boggs (US) LLP (57) ABSTRACT

A service brake caliper and the parking brake caliper (hereinafter called P caliper) are supported by a swing arm rotatably supporting the rear wheel. The service brake caliper and the P caliper are configured to brake the brake disc. In the rear brake device of the vehicle, the service brake caliper and the P caliper are fixed to a stay member, the stay member being supported by the swing arm. At least some of the service brake caliper and the P caliper are arranged in positions forward of a vehicle body and upward of the vehicle body from an axle of the rear wheel. A first boss and a third boss are arranged on a straight line passing through a center point of the axle.

12 Claims, 10 Drawing Sheets

(51) Int. Cl.
*B62K 19/38* (2006.01)
*B62K 25/28* (2006.01)

(58) Field of Classification Search
CPC ..... F16D 2055/0008; F16D 2055/0091; F16D 2121/04; F16D 2121/14
USPC ........................................................ 180/219
See application file for complete search history.

(56) References Cited

U.S. PATENT DOCUMENTS

| | | | |
|---|---|---|---|
| 9,422,991 B2 | 8/2016 | Nessi et al. | |
| 9,567,032 B2 | 2/2017 | Nagai et al. | |
| 2005/0099264 A1* | 5/2005 | Konno | B62H 5/00 340/5.64 |
| 2013/0075180 A1* | 3/2013 | Hombo | B62K 25/283 180/227 |
| 2015/0021125 A1 | 1/2015 | Nessi et al. | |
| 2015/0291250 A1 | 10/2015 | Nagai et al. | |

FOREIGN PATENT DOCUMENTS

| | | | |
|---|---|---|---|
| CN | 104768842 A | 7/2015 | |
| EP | 2574536 A2 | 4/2013 | |
| EP | 2915731 A1 * | 9/2015 | ............. B62L 1/005 |
| EP | 2915731 A1 | 9/2015 | |
| JP | S5395973 U | 8/1978 | |
| JP | S631830 A | 1/1988 | |
| JP | 2006-315680 A | 11/2006 | |
| JP | 2009280205 A | 12/2009 | |
| JP | 2014070704 A | 4/2014 | |
| WO | 2013121395 A1 | 8/2013 | |

OTHER PUBLICATIONS

Japanese Office Action Notification of Reasons for Refusal application No. 2016-192127 dated Jul. 4, 2018.
Chinese Office Action issued in corresponding Chinese Patent Application No. 201710906542.9 dated May 5, 2019.

* cited by examiner

REAR BRAKE DEVICE OF VEHICLE

CROSS-REFERENCE TO RELATED APPLICATIONS

The present application claims priority under 35 USC 119 to Japanese Patent Application No. 2016-192127 filed Sep. 29, 2016 the entire contents of which are hereby expressly incorporated by reference.

TECHNICAL FIELD

The present invention relates to a rear brake device of a vehicle, and especially relates to a rear brake device of a vehicle including a parking brake caliper in addition to a service brake caliper.

BACKGROUND ART

Recently, a rear brake device of a vehicle has been known. The rear brake device for the vehicle is configured to include a service bake caliper and a parking brake caliper. The service brake caliper is configured to generate braking force for a rear wheel during traveling by manipulation of a rear wheel brake operation element. The parking brake caliper is configured to generate braking force for the rear wheel during stopping by manipulation of a parking brake operation element.

Patent Literature 1 discloses a rear brake device of a motorcycle. The rear brake device of the motorcycle is configured in such a manner that with respect to a swing arm rotatably supporting a rear wheel, a service brake caliper is arranged in a position behind an axle of the rear wheel, and a parking brake caliper is arranged in a position above the axle of the rear wheel.

CITATION LIST

Patent Literature

Patent Document 1: JP 2006-315680 A

SUMMARY OF INVENTION

Technical Problem

However, a structure described in Patent Literature 1 has such a problem that since the two brake calipers are respectively provided with stay members for fixing to the swing arm, an arrangement space for the brake calipers and the number of components are likely increased.

It is an object of the present invention to solve the problems of the conventional technology and provide a rear brake device of a vehicle configured to reduce an arrangement space and the number of components for a service brake caliper and a parking brake caliper.

Solution to Problems

To achieve the afore-mentioned object, the present invention has a first feature in that a rear brake device of a vehicle comprising: a brake disc (36, 36a) rotating integrally with a rear wheel (WR) of the vehicle (1), and a service brake caliper (50) and a parking brake caliper (90, 150), the service brake caliper (50) and the parking brake caliper (90, 150) being supported by a swing arm (20) rotatably supporting the rear wheel (WR), the service brake caliper (50) and the parking brake caliper (90, 150) being configured to brake the brake disc (36, 36a), wherein the service brake caliper (50) and the parking brake caliper (90, 150) are fixed to a stay member (40, 100), the stay member (40, 100) being supported by the swing arm (20), and at least some of the service brake caliper (50) and the parking brake caliper (90, 150) are arranged in positions forward of a vehicle body and upward of the vehicle body from an axle (37) of the rear wheel (WR).

The present invention has a second feature in that the service brake caliper (50) is provided with a first boss (54), the first boss (54) being provided to fix the service brake caliper (50) to the stay member (40), the parking brake caliper (90) is provided with a third boss (93), the third boss (93) being provided to fix the parking brake caliper (90) to the stay member (40), the third boss (93) is arranged below the first boss (54), and at least some of the first boss (54) and the third boss (93) are positioned on the same straight line (L), the straight line (L) being passed through a center point (0) of the axle (37).

The present invention has a third feature in that the service brake caliper (50) is provided with a second boss (55) and a piston (57), the second boss (55) being provided to fix the service brake caliper (50) to the stay member (40), the piston (57) being provided to push-press a brake pad (95) to the brake disc (36), the second boss (55) is provided in a position opposed to the third boss (93) of the parking brake caliper (90) across the piston (57), and the service brake caliper (50) is configured to be swung to a side of the parking brake caliper (90) with a portion of the first boss (54) as the center of oscillation by removing a fixing member (55a), the fixing member (55a) being provided to fix the second boss (55) to the stay member (40).

The present invention has a fourth feature in that the stay member (40) is provided with an engagement portion (40d), the engagement portion (40d) being engaged with a positioning protrusion (20a) of the swing arm (20) in a position forward of the vehicle body from the axle (37), and the service brake caliper (50), the parking brake caliper (90) and the engagement portion (40d) are arranged within a range of substantially 90 degrees on the basis of the center point (0) of the axle (37) in the order of the engagement portion (40d), the parking brake caliper (90) and the service brake caliper (50) from a front side of the vehicle body.

The present invention has a fifth feature in that the swing arm (20) is swingably supported with respect to a vehicle body frame (3) of the vehicle (1), a side of the vehicle body frame (3) is mounted with a muffler (24), the muffler (24) discharging combustion gas from an engine (17), and the service brake caliper (50) and the parking brake caliper (90) are covered with the muffler (24) in a side view of the vehicle body when the swing arm (20) is swung.

Advantageous Effects of Invention

According to the first feature, the service brake caliper (50) and the parking brake caliper (90, 150) are fixed to a stay member (40, 100), the stay member (40, 100) being supported by the swing arm (20), and at least some of the service brake caliper (50) and the parking brake caliper (90, 150) are arranged in positions forward of a vehicle body and upward of the vehicle body from an axle (37) of the rear wheel (WR). Therefore, the two brake calipers for braking the same brake disc are arranged with respect to the same stay member in the positions forward and upward of the vehicle body from the axle. For this reason, the stay member can be miniaturized and lightened, and also the two brake calipers can be protected by the swing arm from below. Also, for example, in comparison with such a structure that the two brake calipers are dispersively arranged on an upper side and a lower side of the swing arm, pipes and cables used for connection of the brake operation elements such as a lever and a pedal with the brake calipers can be shortened.

According to the second feature, the service brake caliper (50) is provided with a first boss (54), the first boss (54) being provided to fix the service brake caliper (50) to the stay member (40), the parking brake caliper (90) is provided with a third boss (93), the third boss (93) being provided to fix the parking brake caliper (90) to the stay member (40), the third boss (93) is arranged below the first boss (54), and at least some of the first boss (54) and the third boss (93) are positioned on the same straight line (L), the straight line (L) being passed through a center point (O) of the axle (37). Therefore, dimensions of the two calipers in a longitudinal direction and a vertical direction of the vehicle body can be reduced. Detailedly, in the case that an arc on the basis of the center point of the axle of the rear wheel is supposed, the entire rear brake device can be miniaturized in a radial direction and a peripheral direction.

According to the third feature, the service brake caliper (50) is provided with a second boss (55) and a piston (57), the second boss (55) being provided to fix the service brake caliper (50) to the stay member (40), the piston (57) being provided to push-press a brake pad (95) to the brake disc (36), the second boss (55) is provided in a position opposed to the third boss (93) of the parking brake caliper (90) across the piston (57), and the service brake caliper (50) is configured to be swung to a side of the parking brake caliper (90) with a portion of the first boss (54) as the center of oscillation by removing a fixing member (55a), the fixing member (55a) being provided to fix the second boss (55) to the stay member (40). Therefore, the two bosses for fixing the service brake caliper to the stay member are spatially arranged in the positions opposed to each other across the piston. For this reason, fastening rigidity with respect to the stay member can be increased. Also, since the service brake caliper can be swung around the first boss portion, the brake pad can be replaced without removing the service brake caliper from the stay member.

According to the fourth feature, the stay member (40) is provided with an engagement portion (40d), the engagement portion (40d) being engaged with a positioning protrusion (20a) of the swing arm (20) in a position forward of the vehicle body from the axle (37), and the service brake caliper (50), the parking brake caliper (90) and the engagement portion (40d) are arranged within a range of substantially 90 degrees on the basis of the center point (O) of the axle (37) in the order of the engagement portion (40d), the parking brake caliper (90) and the service brake caliper (50) from a front side of the vehicle body. Therefore, the three elements related to the circular brake disc are arranged within a predetermined range on the basis of the center point. For this reason, an efficient layout with the space effectively utilized can be realized. With this arrangement, while miniaturizing the stay member, a load acting on the stay member when braking the brake disc can be received by the whole of the stay member.

According to the fifth feature, the swing arm (20) is swingably supported with respect to a vehicle body frame (3) of the vehicle (1), a side of the vehicle body frame (3) is mounted with a muffler (24), the muffler (24) discharging combustion gas from an engine (17), and the service brake caliper (50) and the parking brake caliper (90) are covered with the muffler (24) in a side view of the vehicle body when the swing arm (20) is swung. Therefore, when the swing arm is greatly swung during traveling or the like on a desolate land, it is conceivable that an obstacle such as a difference in level of a road surface and stones approaches the lateral sides of the two brake calipers. However, since the lateral sides of the brake calipers are covered with the muffler, the brake calipers can be protected. With this arrangement, the protective covers for the brake calipers are no more required, and the weight and the costs can be reduced.

DESCRIPTION OF EMBODIMENTS

Figure 1:
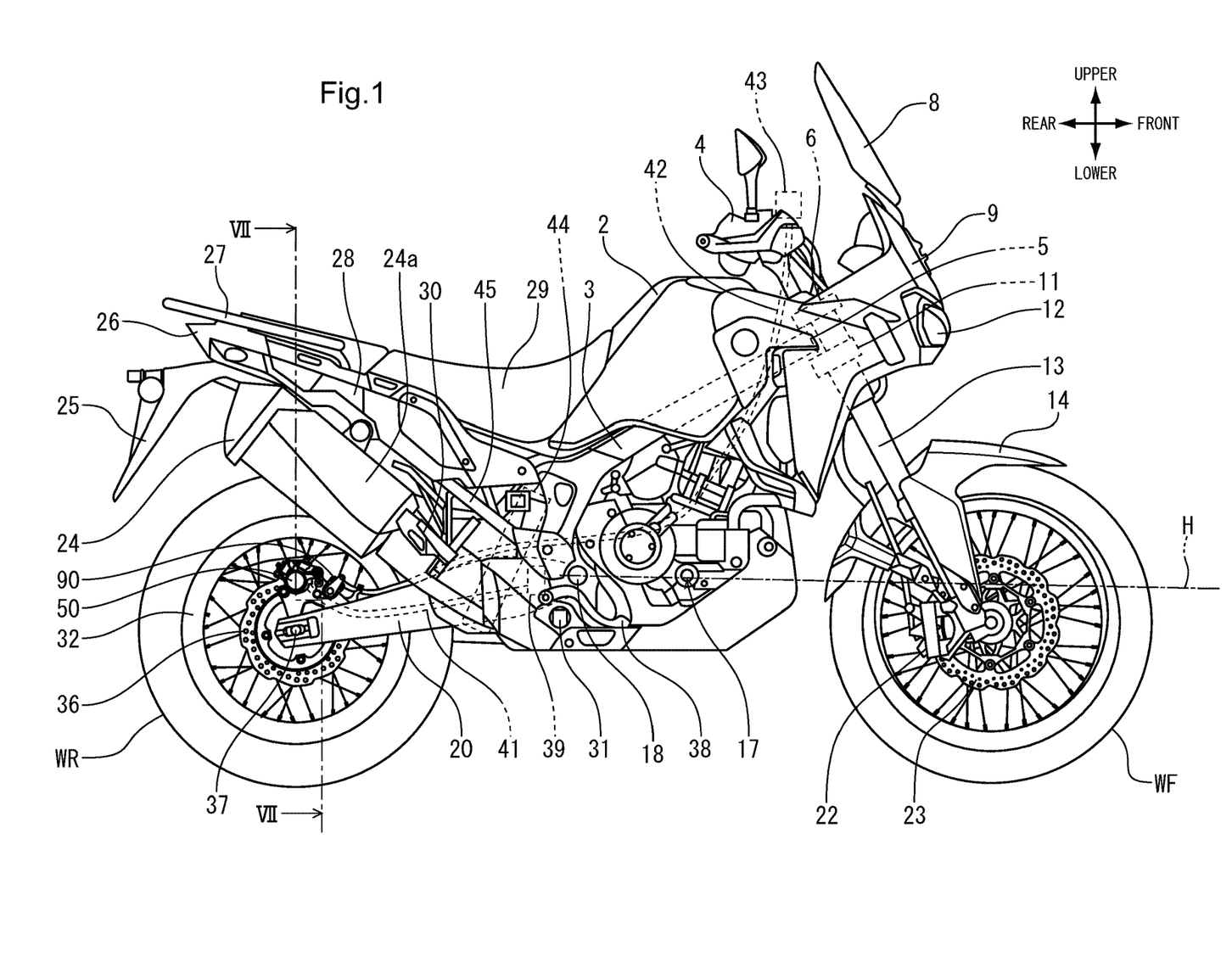
FIG. 1 is a right side view of a motorcycle applied with a rear brake device of a vehicle according to a first embodiment of the present invention.

A preferable embodiment of the present invention will be detailedly described below with reference to drawings. FIG. 1 is a right side view of a motorcycle 1 applied with a rear brake device of a vehicle according to a first embodiment of the present invention. The motorcycle 1 is a saddle-ride type vehicle as a dual-purpose type configured to travel in such a manner that driving force of an engine 17 as a power source is transmitted to a rear wheel WR.

A head pipe 5 for swingably supporting an unillustrated steering shaft is provided at an end of a vehicle body frame 3 forward of a vehicle body, the vehicle body frame 3 configuring the vehicle body frame. A pair of right and left front forks 13 rotatably supporting a front wheel WF is supported by a top bridge 6 and a bottom bridge 11. The top bridge 6 and the bottom bridge 11 are fixed to the steering shaft in positions above and below the head pipe 5. A steering handlebar 4 is fixed to an upper portion of the top bridge 6. The front wheel WR is provided with a front brake device including a brake disc 23 and a brake caliper 22.

The engine 17 is arranged below the vehicle body frame 3, and a pivot 18 is arranged below a rear end of the vehicle body frame 3. The pivot 18 swingably supports a front end of the swing arm 20 rotatably supporting the rear wheel WR. The swing arm 20 is hung on the vehicle body frame 3 by a rear cushion 44 in a position behind the pivot 18. A pair of right and left footrest steps 31 is attached below the pivot 18.

The rear brake device including the brake disc 36, a service brake caliper 50 and a parking brake caliper 90 is arranged on a right side of the rear wheel WR in a vehicle width direction, the rear wheel WR being configured in such a manner that a tire member is engaged with a peripheral portion of a wheel member 32. The service brake caliper 50 for generating the braking force mainly during traveling is formed as a hydraulic type, the hydraulic type being configured to transmit hydraulic pressure generated in a master cylinder 39 by manipulation of a brake pedal 38 to a brake hose 41. On the other hand, the parking brake caliper 90 for prohibiting rotation of the rear wheel WR during stopping is formed as a mechanical type, the mechanical type being configured to be brought into operation by traction of a brake cable 42 coupled to a parking brake operation element 43 provided to the steering handlebar 4.

A front side of the steering handlebar 4 is covered with a front cowl 9 supporting a headlight 12 and a windshield 8. A front fender 14 for covering the front wheel WF from above is fixed to the front forks 13. A fuel tank 2 fixed to the vehicle body frame 3 is arranged between the steering handlebar 4 and a seat 29. A seat frame 45 extending upward to the rear of the vehicle body is coupled to a rear portion of the vehicle body frame 3. A side cover 28, a grab bar 27, and a pair of right and left tandem steps 30 are fixed to the seat frame 45. A tail lamp device 26 and a rear fender 25 are arranged behind the side cover 28.

The combustion gas from the engine 17 is discharged from a muffler 24 on the right side in the vehicle width direction. The muffler 24 is fixed to the seat frame 45 in a position in the center in the longitudinal direction. A cover member 24a as a heat insulating plate is mounted on the muffler 24. The swing arm 20 configured to be swingable around the pivot 18 of the vehicle body frame 3 is configured to have a predetermined suspension angle to a lower side of the vehicle body with respect to a horizontal line H (for example, 10 degrees to the lower side) in a state of an empty vehicle IG as the unladen motorcycle 1 placed in an upright state.

Figure 2:
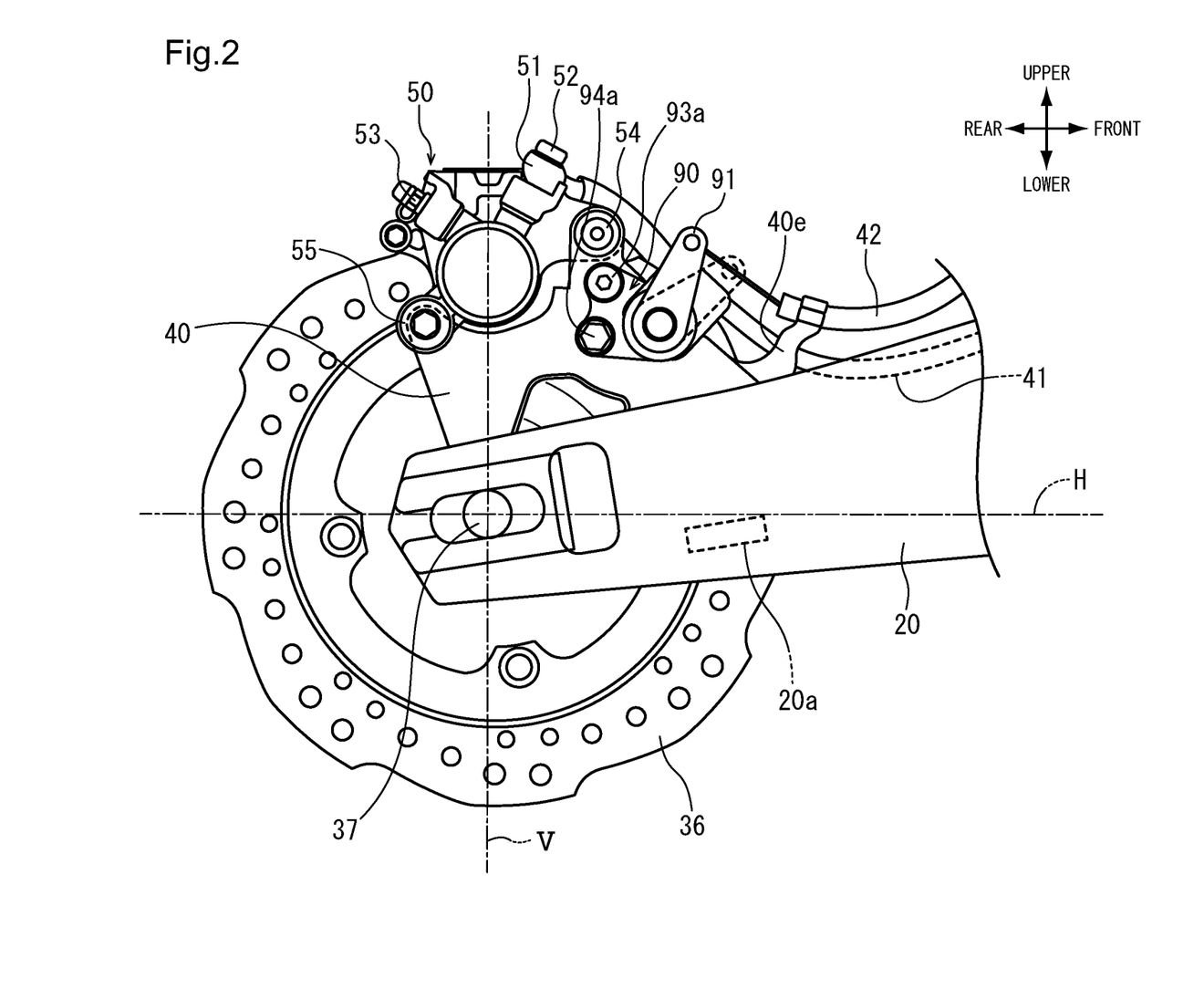
FIG. 2 is an enlarged view showing a structure of the rear brake device.
Figure 3:
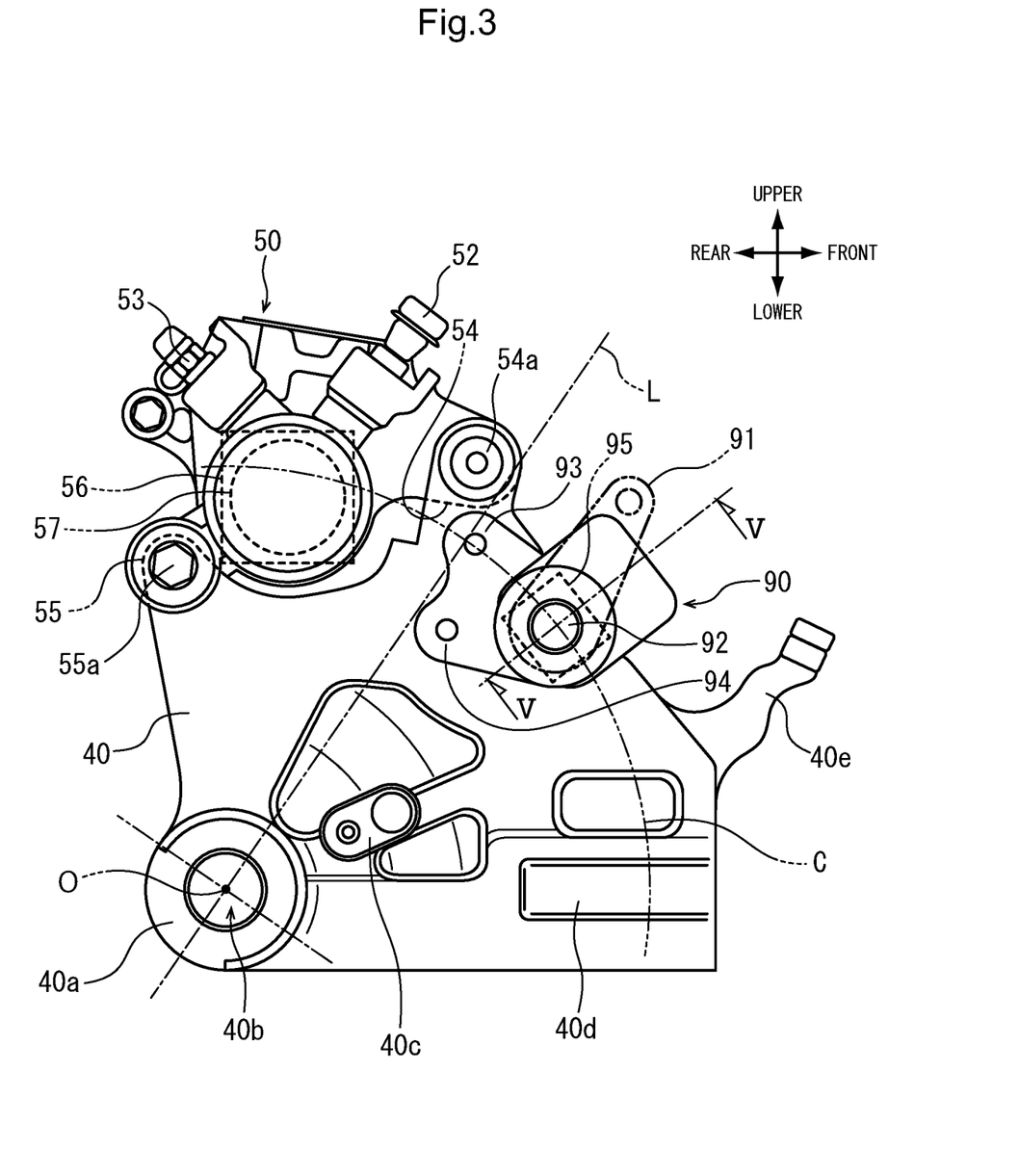
FIG. 3 is an enlarged view with two brake calipers fixed to a stay member.

FIG. 2 is an enlarged view showing a structure of the rear brake device. Also, FIG. 3 is an enlarged view with the two brake calipers 50, 90 fixed to the stay member 40. A vertical line V is a line perpendicular to the horizontal line H shown also in FIG. 1. The stay member 40 having a predetermined thickness and made of a metal plate such as aluminum is arranged between the brake disc 36 and the arm of the swing arm 20 on the right side in the vehicle width direction. The stay member 40 is retained in a predetermined position in such a manner that an engagement portion 40d is engaged with the positioning protrusion 20a formed on an inner surface of the arm on the right side and also the axle 37 is passed through a through hole 40b formed in a flange portion 40a.

A banjo 51 connected to an end of the brake hose 41 is fixed to the service brake caliper 50 by a banjo bolt 52. When the hydraulic pressure is transmitted from the brake hose 41 in accordance with manipulation of the brake pedal 38, a hydraulic piston 57 is slid inward in the vehicle width direction to press a brake pad 56 to the brake disc 36.

The service brake caliper 50 is fixed to the upper portion of the stay member 40 by a first boss 54 on the front side of the vehicle body and a second boss 55 on the rear side of the vehicle body. Detailedly, in regard to the portion of the first boss 54, the service brake caliper 50 is rotatably supported with respect to the stay member 40 by a first fixing member 54a passed through the first boss 54. On the other hand, in regard to the portion of the second boss 55, the service brake caliper 50 is fixed to the stay member 40 by a second fixing member 55a passed through the second boss 55. A bleeder valve 53 for bleeding air is provided to a rear portion at an upper end of the service brake caliper 50.

The parking brake caliper 90 is formed as the mechanical type, the mechanical type being configured to put a brake pad 95 into operation by rocking a rocker arm 91 by the brake cable 42 coupled to the parking brake operation element 43. Detailedly, the parking brake caliper 90 has such a structure that a multiple-start thread member (see FIG. 5) is connected to a rocking shaft 92 of the rocker arm 91, and rotational motion is converted into reciprocating motion by the multiple-start thread member, so that the brake bad 95 is pressed to the brake disc 36. The parking brake caliper 90 is fixed to the stay member 40 by fastening members 93a, 94a passed through the two third bosses 93, 94 formed on the rear side of the vehicle body.

A cable supporting portion 40e for supporting the brake cable 42 is provided at a front edge of the stay member 40, and a speed sensor mounting boss 40c is provided forward of the flange portion 40a. The flange portion 40a is provided so that the axle 37 is passed through the flange portion 40a. Note that the parking brake caliper 90 according to the present embodiment has such a configuration that play of brake activation is adjusted by adjusting a pulling rate of the brake cable 42 by a swinging portion of the parking brake operation element 43.

In the rear brake device according to the present embodiment, the two third bosses 93, 94 of the parking brake caliper 90 are positioned below the first boss 54 of the service brake caliper 50. Further, the third boss 93 on the upper side and the first boss 54 are respectively arranged in positions overlapping with the straight line L in the radial direction passing through the center point O of the brake disc 36 (the center point O of the axle 37).

With the above-described structure, since the two brake calipers 50, 90 are fixed to the single stay member 40, the stay member 40 can be miniaturized and lightened. Also, since the two brake calipers 50, 90 are arranged close to a position forward and upward of the vehicle body from the axle 37, the dimension of the rear brake device in the longitudinal direction of the vehicle body can be reduced, and also the two brake calipers 50, 90 can be protected from below by the swing arm 20.

Especially in the present embodiment, since the third boss 93 on the upper side and the first boss 54 are respectively arranged in the positions overlapping with the straight line L in the radial direction passing through the center point O of the axle 37, when supposing the circular arc on the basis of the center point O, the total rear brake device can be miniaturized in the radial direction and the peripheral direction. Also, for example, in comparison with such a structure that the two brake calipers 50, 90 are dispersively arranged on the upper side and the lower side of the swing arm 20, the length of the brake hose 41 and the brake cable 42 can be shortened, and the stays for supporting both the brake hose 41 and the brake cable 42 to the swing arm or the like can be also reduced.

Further, the two brake calipers 50, 90 and the engagement portion 40d are arranged in positions overlapping on the single circular arc C when supposing the circular arc on the basis of the center point O of the axle 37. Detailedly, the engagement portion 40d, the parking brake caliper 90 and the service brake caliper 50 are arranged in this order from the front side of the vehicle body within the range of 90 degrees. In other words, the engagement portion 40d, the parking brake caliper 90 and the service brake caliper 50 are arranged to be stored in a sector form having a center angle of 90 degrees. In this way, since three elements related to the circular brake disc 36 are arranged corresponding to the circular arc C on the basis of the center point O, the efficient layout with the space effectively utilized can be achieved. With this arrangement, while the stay member 40 is miniaturized, the load acting on the stay member 40 during braking by the service brake caliper 50 can be received by the whole stay member 40.

Figure 4:
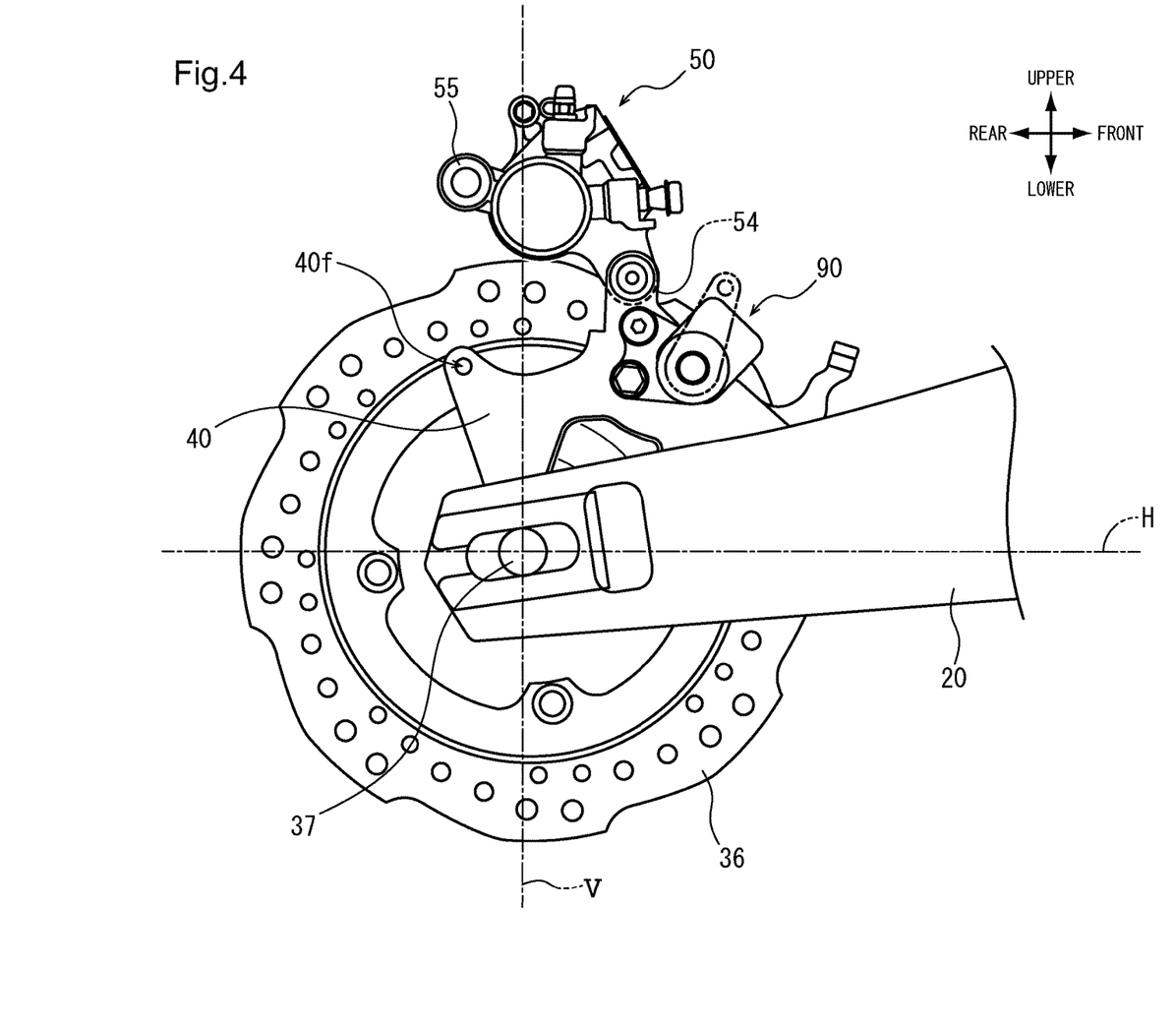
FIG. 4 is an illustration diagram showing a rocking state of a service brake caliper.

FIG. 4 is an illustration diagram showing a rocking state of the service brake caliper 50. As has been described above, in the portion of the first boss 54, the service brake caliper 50 is rotatably supported with respect to the stay member 40 by the first fixing member 54a passed through the first boss 54. On the other hand, in the portion of the second boss 55, the service brake caliper 50 is fixed to the stay member 40 by the second fixing member 55a passed through the second boss 55. For this reason, the service brake caliper 50 can be swung to the forward side of the vehicle body around the portion of the first boss 54, that is, to the side of the parking brake caliper 90, by removing the second fixing member 55a from a screw hole 40f formed in the stay member 40. With this arrangement, the brake pad 56 can be attached and/or detached only by removing one fixing member, and maintainability is enhanced.

Figure 5:
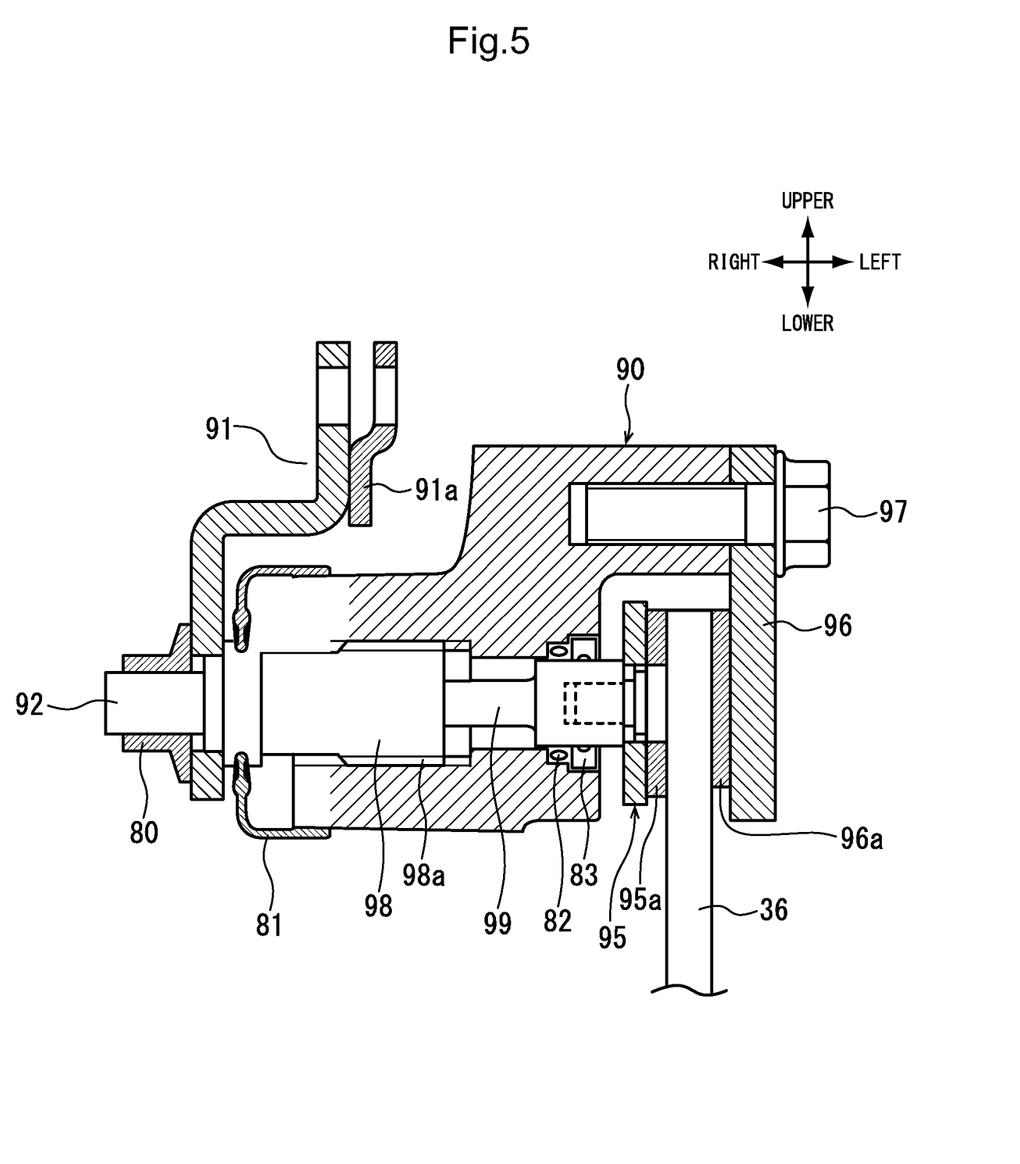
FIG. 5 is a cross-sectional view taken along line V-V in FIG. 3.

FIG. 5 is a cross-sectional view taken along line V-V in FIG. 3. A retaining member 91a for retaining a cylindrical member fixed to the end of the brake cable 42 is fixed to an inner side of the rocker arm 91 in the vehicle width direction. The rocker arm 91 is fixed in a non-rotatable manner to the rocking shaft 92 by a nut 80. A multiple-start thread body 98 coaxially with the rocking shaft 92 is fixed to the inner side of the rocking shaft 92 in the vehicle width direction, and a female screw 98a screwed around the multiple-start thread body 98 is formed on the side of the parking brake caliper 90. Note that a four-start thread or the like can be applied as the multi-start thread. A dust cover 81 for protecting a screw portion is provided on the side of the rear surface of the rocker arm 91.

As has been described above, when the rocker arm 91 is rocked to the forward side of the vehicle body, a pressing member 99 coupled to the multiple-start thread body 98 is moved to the inner side in the vehicle width direction. A large diameter portion of the pressing member 99 is brought into contact with an oil seal 82 and a dust seal 83, so that intrusion of sand or the like is prevented. The pressing member 99 is fixed directly to the brake pad 95 having a brake lining 95a. Also, a brake lining 96a brought into contact with the inner side of the brake disc 36 in the vehicle width direction is also fixed directly to a supporting member 96 attached to the inner side of the parking brake caliper 90 in the vehicle width direction by a bolt 97. Because, in the parking brake with low consumption of the brake lining, replacement of the brake pad is not supposed.

Figure 6:
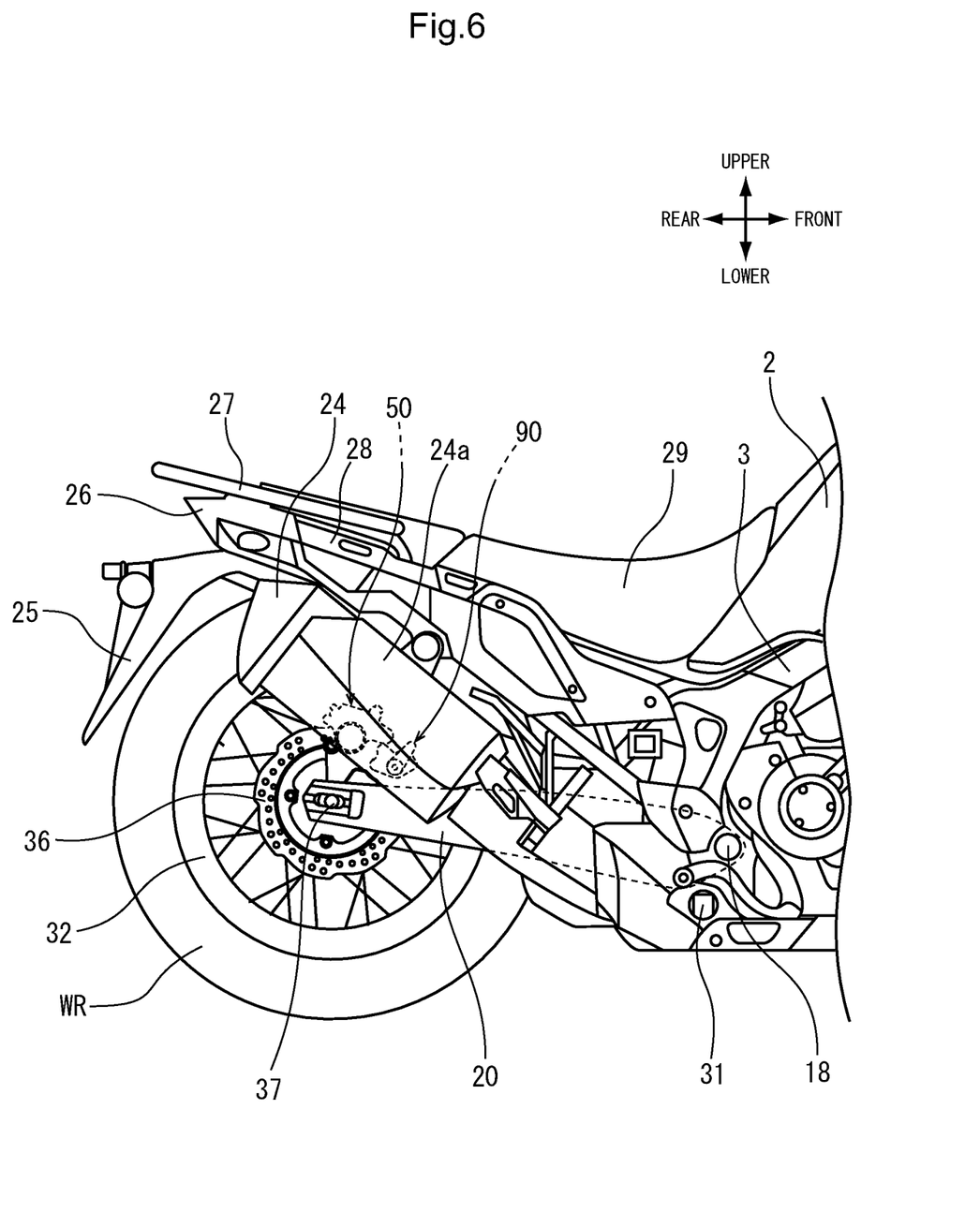
FIG. 6 is a partially enlarged side view of the motorcycle.
Figure 7:
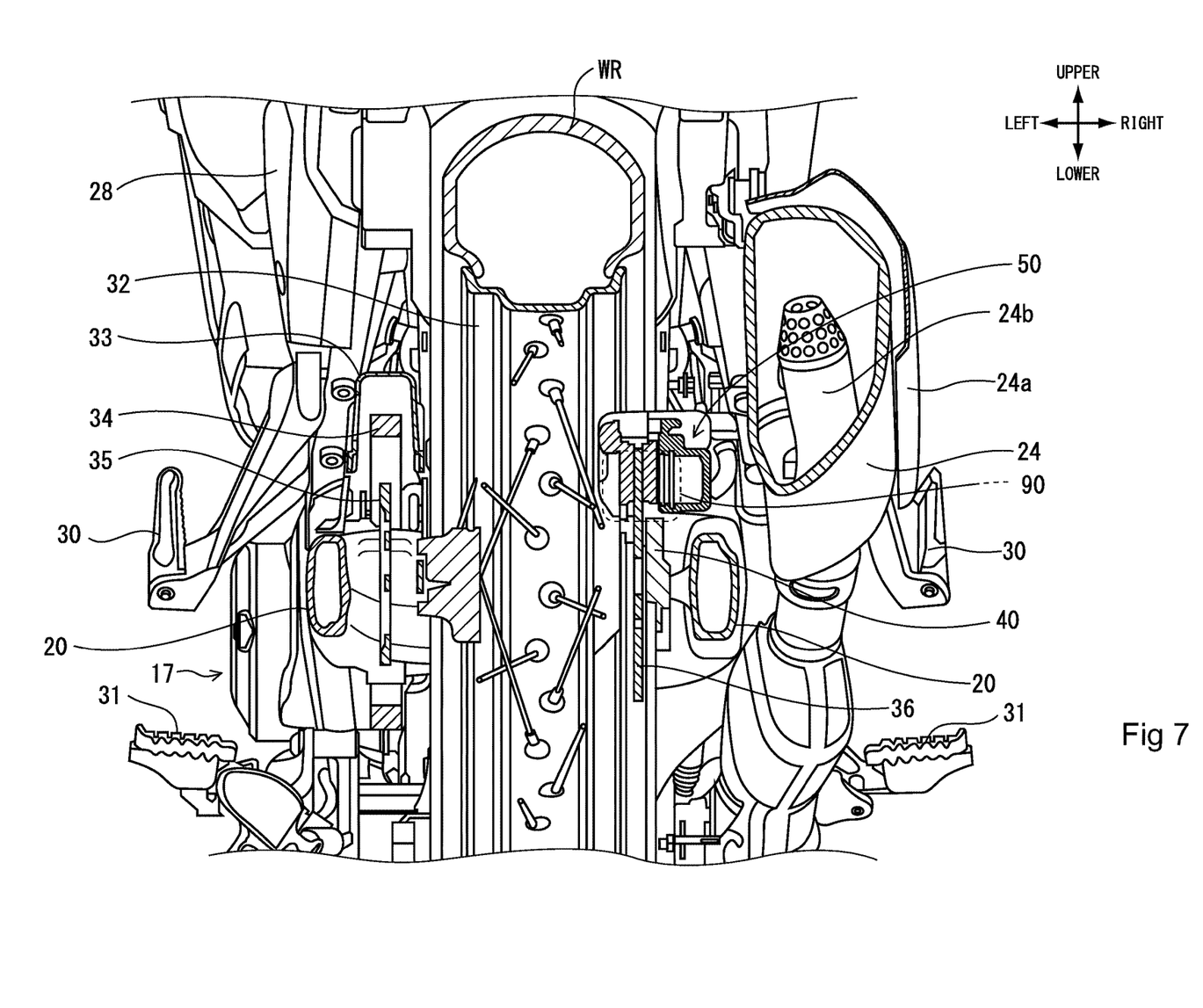
FIG. 7 is a cross-sectional view taken along line VII-VII in FIG. 1.
Figure 8:
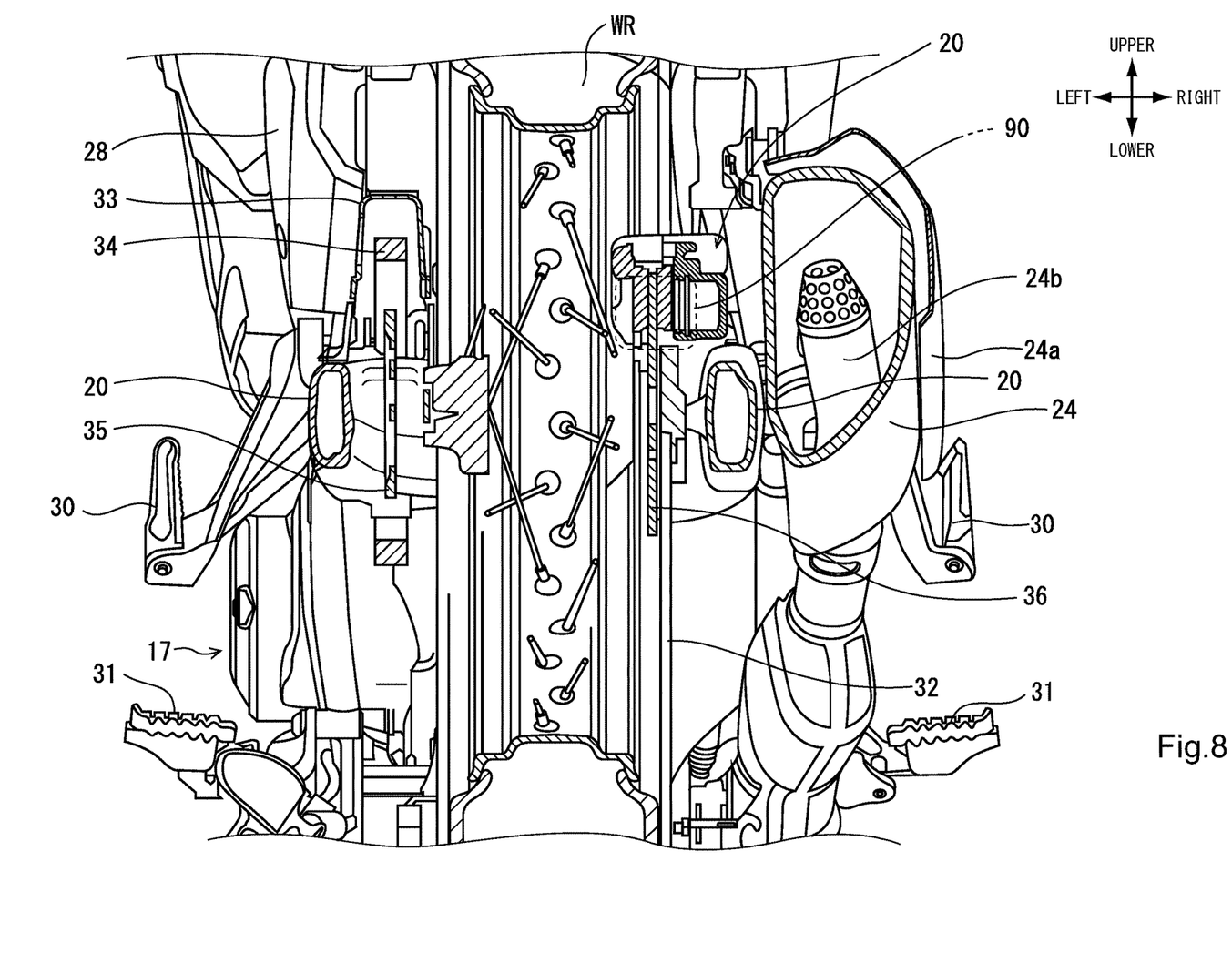
FIG. 8 is a cross-sectional view when the swing arm is greatly swung from the state shown in FIG. 7.

FIG. 6 is a partially enlarged side view of the motorcycle 1. Also, FIG. 7 is a cross-sectional view taken along line VII-VII in FIG. 1, and FIG. 8 is a cross-sectional view when the swing arm 20 is greatly swung from the state shown in FIG. 7. In the present embodiment, the brake disc 36 is fixed to the right side of the wheel member 32 in the vehicle width direction, and a driven sprocket 35 wound with a drive chain 34 is fixed to a left side of the wheel member 32 in the vehicle width direction, the drive chain 34 transmitting the driving force of the engine 17 to the rear wheel WR. The drive chain 34 is covered from above with a chain cover 33 attached to the swing arm 20. A wall surface of the muffler 24 inward in the vehicle width direction is formed into a planar shape directed to the vertical direction of the vehicle body, the muffler 24 incorporating a silencing pipe 24b.

In FIGS. 6 and 8, such a state is shown that the swing arm 20 is greatly swung due to a landing or the like after jumping. In the present embodiment, when the swing arm 20 is greatly swung, in a side view of the vehicle body, both the service brake caliper 50 and the parking brake caliper 90 are configured to be covered with the muffler 24.

Especially, when the swing arm 20 is greatly swung during the traveling or the like on a desolate land, it is conceivable that an obstacle such as a difference in level of a road surface and stones approaches the lateral sides of the two brake calipers 50, 90. Thus, the lateral sides of the brake calipers 50, 90 can be protected by covering the two brake calipers 50, 90 with the muffler 24. With this structure, the protective covers for the brake calipers 50, 90 are no more required, and the number of components and costs can be reduced.

In the present embodiment, since the service brake caliper 50 is arranged behind and above the parking brake caliper 90, when the swing arm 20 is greatly swung, both the brake calipers 50, 90 are promptly covered with a lower edge of the muffler 24 directed upward to the rear of the vehicle body. This structure is preferable.

Figure 9:
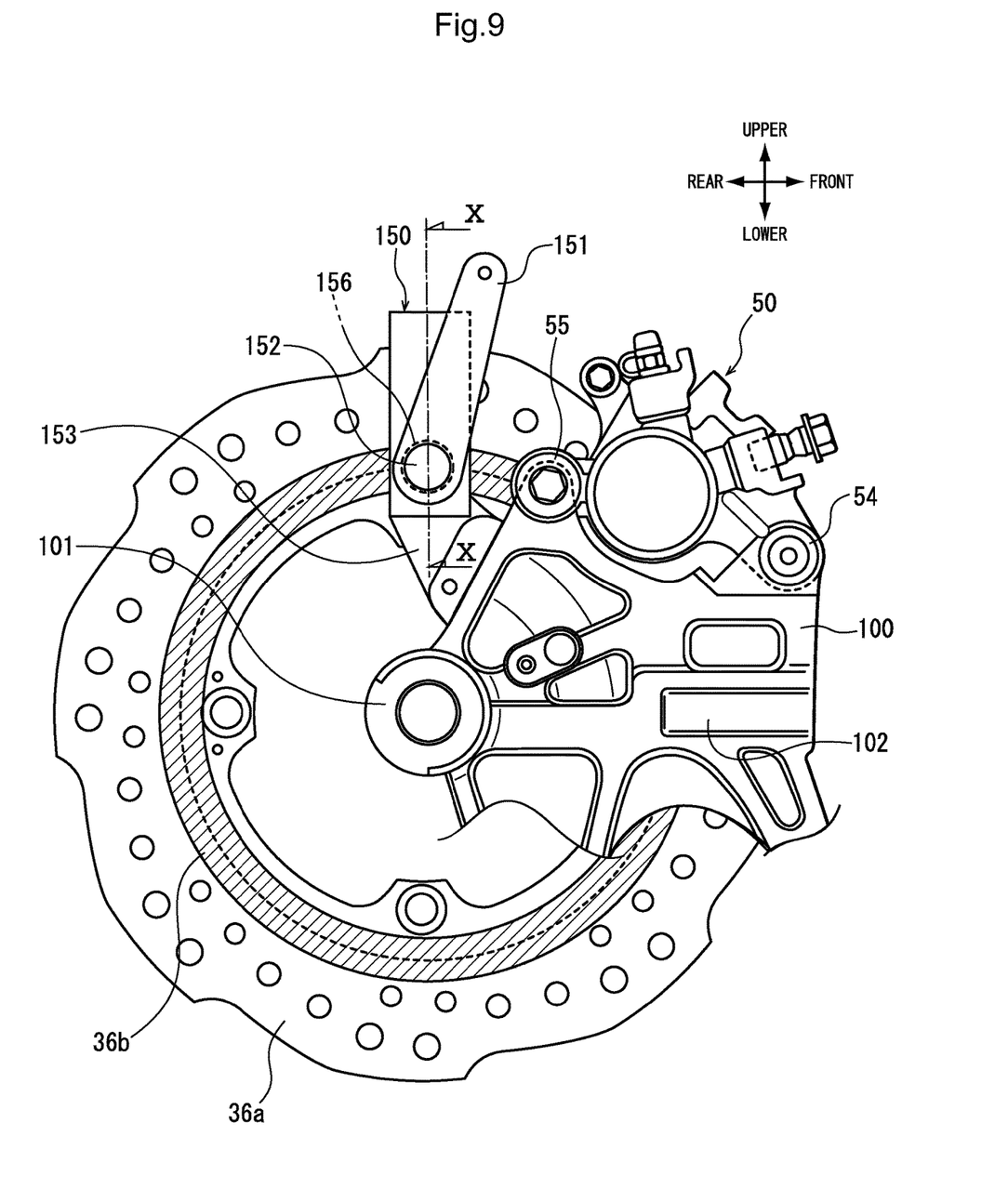
FIG. 9 is an illustration diagram of a rear brake device according to a second embodiment of the present invention.
Figure 10:
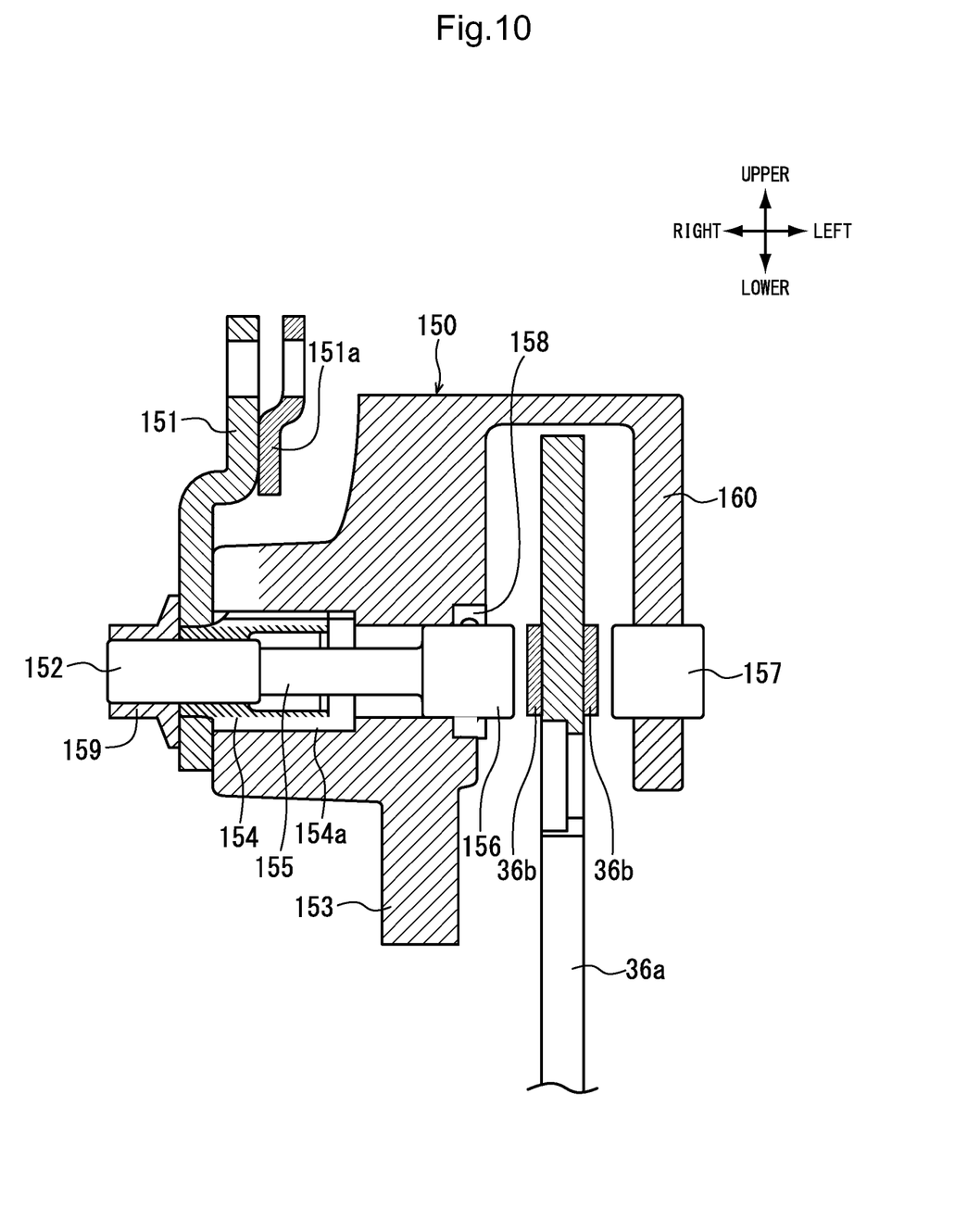
FIG. 10 is a cross-sectional view taken along line X-X in FIG. 9.

FIG. 9 is an illustration diagram of a rear brake device according to a second embodiment of the present invention. Also, FIG. 10 is a cross-sectional view taken along line X-X in FIG. 9. In the present embodiment, the rear brake device is configured in such a manner that a service brake caliper 50 and a parking brake caliper 150 are fixed to an upper portion of a stay member 100 having a flange portion 101 and an engagement portion 102. The flange portion 101 is configured such that an axle 37 is passed through the flange portion 101. The engagement portion 102 is configured to be engaged with a positioning protrusion 20a formed on an inner surface of a swing arm 20 in a vehicle width direction.

Hereat, in a brake disc 36a according to the present embodiment, an annular brake lining 36b is attached directly to an inner side of a braking surface of the service brake caliper 50. The parking brake caliper 150 activated by rocking a rocker arm 151 is configured to generate braking force by pressing a piston 156 to the brake lining 36b, the piston 156 being made of the same stainless or the like as the brake disc 36a.

With reference to FIG. 10, an extension portion 153 for fixing to the stay member 100 is formed on the lower side of the vehicle body of the barking brake caliper 150. A retaining member 151a is attached to an inner side of the rocker arm 151 in the vehicle width direction, the retaining member 151a being provided to retain a cylindrical member fixed to an end of the brake cable 42. The rocker arm 151 is fixed in a non-rotatable manner to a rocking shaft 152 by a nut 159. A multiple-start thread body 154 coaxially with the rocking shaft 152 is fixed to the inner side of the rocking shaft 152 in the vehicle width direction. A female screw 154a screwed around the multiple-start thread body 154 is formed on a side of the parking brake caliper 150.

When the rocker arm 151 is rocked to a forward side of the vehicle body, a pressing member 155 coupled to the multiple-start thread body 154 is moved inward in the vehicle width direction. The piston 156 provided at an end of the pressing member 155 is brought into contact with a seal member 158, so that intrusion of sand or the like is prevented. Also, an annular brake lining 36b is attached directly also to the inner surface of the brake disc 36a in the vehicle width direction. The brake lining 36b on this side is pressed to a metal piston 157 buried in an inner wall member 160 of the parking brake caliper 150.

As has been described above, with the rear brake device according to the present invention, the rear brake device of the vehicle includes the brake discs 36, 36a, and the service brake caliper 50 and the parking brake calipers 90, 150. The brake discs 36, 36a rotate integrally with the rear wheel WR.

The service brake caliper 50 and the parking brake calipers 90, 150 are supported by the swing arm 20 rotatably supporting the rear wheel, and the service brake caliper 50 and the parking brake calipers 90, 150 brake the brake discs 36, 36a. In the rear brake device of the vehicle, the service brake caliper 50 and the parking brake calipers 90, 150 are respectively fixed to the single stay member 40 and the single stay member 100 supported by the swing arm 20, and at least some of the service brake caliper 50 and the parking brake calipers 90, 150 are arranged in the positions forward of the vehicle body and upward of the vehicle body from the axle 37 of the rear wheel WR. The two brake calipers for braking the same brake disc are arranged with respect to the same stay members 40, 100 in the positions forward and upward of the vehicle body from the axle 37. For this reason, the stay members 40, 100 can be miniaturized and lightened, and also the two brake calipers can be protected from below by the swing arm.

Note that the shape and the configuration of the service brake caliper and the parking brake caliper, the shape and the configuration of the swing arm, the shape of the stay member, an arrangement relationship between the two brake calipers, the shapes of the first boss, the second boss and the third boss, and the like are not limited to the above-described embodiment. Various design modification may be made. The rear brake device of the vehicle according to the present invention is not limited to the motorcycle, and can be applied to various kinds of vehicles such as saddle-ride type three-wheeled/four-wheeled vehicles.

REFERENCE SIGNS LIST

1 . . . motorcycle (vehicle),
3 . . . vehicle body frame,
17 . . . engine,
20 . . . swing arm,
36 . . . brake disc,
37 . . . axle,
40 . . . stay member,
40d . . . engagement portion,
41 . . . brake hose,
42 . . . brake cable,
50 . . . service brake caliper,
54 . . . first boss,
55 . . . second boss,
55a . . . fixing member,
57 . . . hydraulic piston,
90 . . . parking brake caliper,
93, 94 . . . third boss,
100 . . . stay member,
150 . . . barking brake caliper,
H . . . horizontal line,
V . . . vertical line,
WR . . . rear wheel,
O . . . center point,
L . . . straight line,
C . . . circular arc

What is claimed is:

1. A rear brake device of a vehicle comprising:
a brake disc that is configured to rotate integrally with a rear wheel of the vehicle, and
a service brake caliper and a parking brake caliper, the service brake caliper and the parking brake caliper being supported by a swing arm rotatably supporting the rear wheel, the service brake caliper and the parking brake caliper being configured to brake the brake disc,
wherein the service brake caliper and the parking brake caliper are fixed to a stay member, the stay member being supported by the swing arm,
at least some of the service brake caliper and the parking brake caliper are arranged in positions forward in a vehicle body and upward in the vehicle body relative to an axle of the rear wheel,
wherein the service brake caliper is provided with a first boss, the first boss being provided to fix the service brake caliper to the stay member,
the parking brake caliper is provided with a third boss, the third boss being provided to fix the parking brake caliper to the stay member,
the third boss is arranged below the first boss,
the service brake caliper and the parking brake caliper are disposed to overlap with each other in the longitudinal direction of the vehicle body and in the vertical direction of the vehicle body, and
the service brake caliper and the parking brake caliper are positioned above the upper surface of the swing arm in a side view of the vehicle body.

2. The rear brake device of a vehicle according to claim 1,
wherein at least some of the first boss and the third boss are positioned on the same straight line, the straight line being passed through a center point of the axle.

3. The rear brake device of a vehicle according to claim 2,
wherein the service brake caliper is provided with a second boss and a piston, the second boss being provided to fix the service brake caliper to the stay member, the piston being provided to push-press a brake pad to the brake disc,
the second boss is provided in a position opposed to the third boss of the parking brake caliper across the piston, and
the service brake caliper is configured to be swung to a side of the parking brake caliper with a portion of the first boss as the center of oscillation by removing a fixing member, the fixing member being provided to fix the second boss to the stay member.

4. The rear brake device of a vehicle according to claim 3,
wherein the stay member is provided with an engagement portion, the engagement portion being engaged with a positioning protrusion of the swing arm in a position forward in the vehicle body relative to the axle, and
the service brake caliper, the parking brake caliper and the engagement portion are arranged within a range of substantially 90 degrees on the basis of the center point of the axle in the order of the engagement portion, the parking brake caliper and the service brake caliper from a front side of the vehicle body.

5. The rear brake device of a vehicle according to claim 4,
wherein the swing arm is swingably supported with respect to a vehicle body frame of the vehicle,
a side of the vehicle body frame is mounted with a muffler, the muffler discharging combustion gas from an engine, and
the service brake caliper and the parking brake caliper are covered with the muffler in a side view of the vehicle body when the swing arm is swung.

6. The rear brake device of a vehicle according to claim 3,
wherein the swing arm is swingably supported with respect to a vehicle body frame of the vehicle, a side of the vehicle body frame is mounted with a muffler, the muffler discharging combustion gas from an engine, and the service brake caliper and the parking brake caliper are covered with the muffler in a side view of the vehicle body when the swing arm is swung.

7. The rear brake device of a vehicle according to claim 2, wherein the stay member is provided with an engagement portion, the engagement portion being engaged with a positioning protrusion of the swing arm in a position forward in the vehicle body relative to the axle, and the service brake caliper, the parking brake caliper and the engagement portion are arranged within a range of substantially 90 degrees on the basis of the center point of the axle in the order of the engagement portion, the parking brake caliper and the service brake caliper from a front side of the vehicle body.

8. The rear brake device of a vehicle according to claim 7, wherein the swing arm is swingably supported with respect to a vehicle body frame of the vehicle, a side of the vehicle body frame is mounted with a muffler, the muffler discharging combustion gas from an engine, and the service brake caliper and the parking brake caliper are covered with the muffler in a side view of the vehicle body when the swing arm is swung.

9. The rear brake device of a vehicle according to claim 2, wherein the swing arm is swingably supported with respect to a vehicle body frame of the vehicle, a side of the vehicle body frame is mounted with a muffler, the muffler discharging combustion gas from an engine, and the service brake caliper and the parking brake caliper are covered with the muffler in a side view of the vehicle body when the swing arm is swung.

10. The rear brake device of a vehicle according to claim 1, wherein the stay member is provided with an engagement portion, the engagement portion being engaged with a positioning protrusion of the swing arm in a position forward in the vehicle body relative to the axle, and the service brake caliper, the parking brake caliper and the engagement portion are arranged within a range of substantially 90 degrees on the basis of the center point of the axle in the order of the engagement portion, the parking brake caliper and the service brake caliper from a front side of the vehicle body.

11. The rear brake device of a vehicle according to claim 10, wherein the swing arm is swingably supported with respect to a vehicle body frame of the vehicle, a side of the vehicle body frame is mounted with a muffler, the muffler discharging combustion gas from an engine, and the service brake caliper and the parking brake caliper are covered with the muffler in a side view of the vehicle body when the swing arm is swung.

12. The rear brake device of a vehicle according to claim 1, wherein the swing arm is swingably supported with respect to a vehicle body frame of the vehicle, a side of the vehicle body frame is mounted with a muffler, the muffler discharging combustion gas from an engine, and the service brake caliper and the parking brake caliper are covered with the muffler in a side view of the vehicle body when the swing arm is swung.

* * * * *